(12) United States Patent
Nellen

(10) Patent No.: US 10,343,502 B2
(45) Date of Patent: Jul. 9, 2019

(54) OPEN ROOF CONSTRUCTION FOR A VEHICLE

(71) Applicant: Inalfa Roof Systems Group B.V., Oostrum (NL)

(72) Inventor: Marcel Johan Christiaan Nellen, Merselo (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 44 days.

(21) Appl. No.: 15/654,135

(22) Filed: Jul. 19, 2017

(65) Prior Publication Data
US 2018/0022195 A1    Jan. 25, 2018

(30) Foreign Application Priority Data

Jul. 22, 2016 (DE) .................... 20 2016 104 017 U

(51) Int. Cl.
| | |
|---|---|
| *B60J 7/047* | (2006.01) |
| *B60J 10/24* | (2016.01) |
| *B60J 10/82* | (2016.01) |
| *B60J 7/043* | (2006.01) |
| *B60J 7/053* | (2006.01) |
| B60J 7/057 | (2006.01) |

(52) U.S. Cl.
CPC ............ *B60J 7/047* (2013.01); *B60J 7/043* (2013.01); *B60J 7/053* (2013.01); *B60J 10/24* (2016.02); *B60J 10/82* (2016.02); *B60J 7/0573* (2013.01)

(58) Field of Classification Search
CPC ............ B60J 7/047; B60J 10/82; B60J 7/053

USPC ..... 296/220.01, 222, 216.05, 216.07, 216.08
See application file for complete search history.

(56) References Cited

U.S. PATENT DOCUMENTS

| | | | | |
|---|---|---|---|---|
| 9,845,002 | B2* | 12/2017 | Nellen | ............ B60J 7/043 |
| 10,076,952 | B2* | 9/2018 | Hall | ............ B60J 10/248 |
| 2009/0179462 | A1* | 7/2009 | Nellen | ........... B60J 7/0435 |
| | | | | 296/222 |
| 2013/0307296 | A1* | 11/2013 | Sawada | ............ B60J 7/053 |
| | | | | 296/222 |
| 2014/0049076 | A1* | 2/2014 | Roeder | ........... B29C 44/1271 |
| | | | | 296/216.09 |
| 2015/0061326 | A1* | 3/2015 | Sawada | ........... B60J 7/0435 |
| | | | | 296/216.08 |

(Continued)

FOREIGN PATENT DOCUMENTS

EP    3173271 A1    5/2017

*Primary Examiner* — Jason S Morrow
(74) *Attorney, Agent, or Firm* — Steven M. Koehler; Westman, Champlin & Koehler, P.A.

(57) ABSTRACT

An open roof construction comprises at least one guide rail and front and rear closure panels. An operating mechanism supports the front panel and is adjustable between a closed position and an open position. The operating mechanism comprises rear supports connected to the front panel and two parallel guide tracks. A rear guide track portion extends rearwardly beyond the roof opening. The rear panel and the sidewardly adjacent fixed roof include a passage opening to allow the supports to support the front panel when the support is positioned in the rear guide track portion. The rear panel and the adjacent fixed roof are each provided with a seal to close the passage opening and to allow the support member to move between the seals, which, when viewed from above, extend in a non-parallel fashion with respect to each other and to the guide track.

20 Claims, 8 Drawing Sheets

(56) References Cited

U.S. PATENT DOCUMENTS

2015/0246600 A1\* 9/2015 Sawada ................... B60J 7/043
296/220.01
2016/0207380 A1\* 7/2016 Katayama ................ B60J 10/82

\* cited by examiner

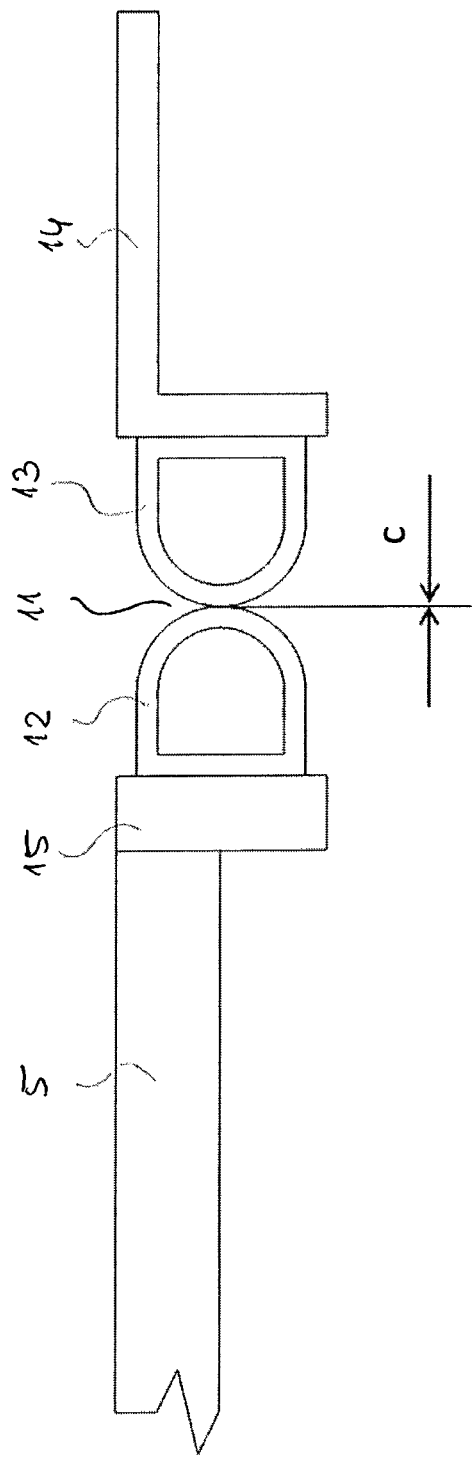
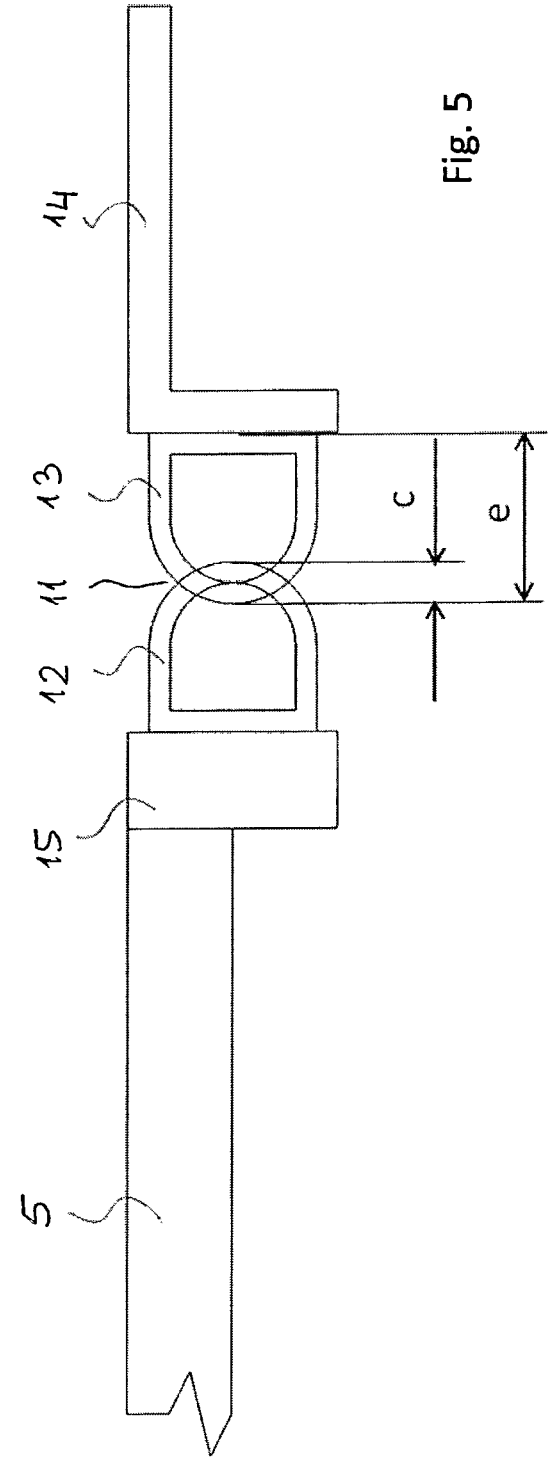

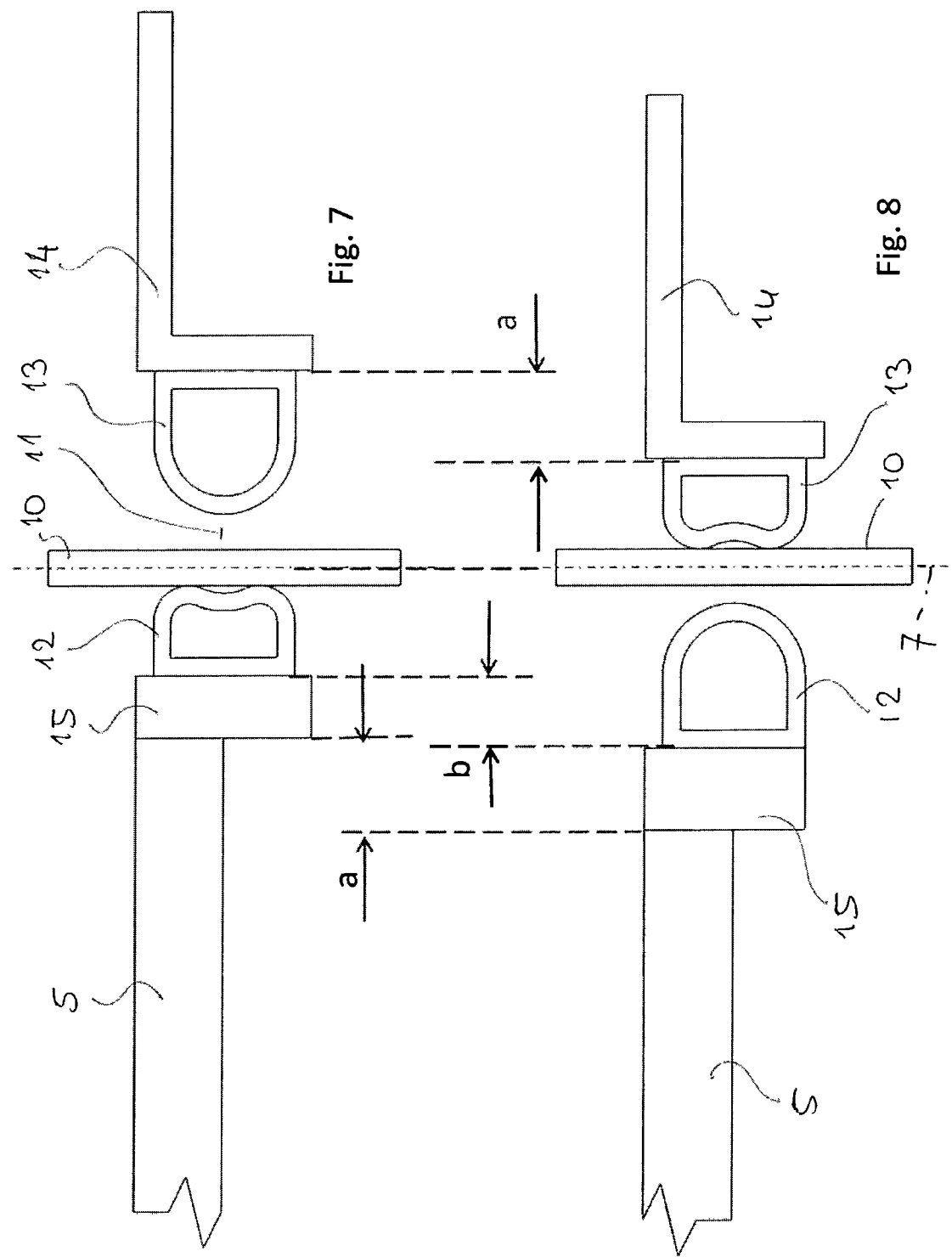

OPEN ROOF CONSTRUCTION FOR A VEHICLE

BACKGROUND

The discussion below is merely provided for general background information and is not intended to be used as an aid in determining the scope of the claimed subject matter.

The present invention relates to an open roof construction for a vehicle having a closure panel movable rearwardly over a fixed roof.

In an open roof construction pivotable and slidable levers are provided for supporting the rear side of the front closure panel, while the front closure panel is also slidable with respect to these levers. The guide tracks for the levers on each side of the roof opening extend parallel to each other and the passage opening between the rear closure panel and the cantrail or roof rail of the fixed roof extends parallel to the adjacent guide track as well. If the cantrail of the vehicle roof does not extend parallel to the adjacent guide track, there must be provided a cover filling the non-parallel gap between the cantrail and the passage opening.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they in-tended to be used as an aid in determining the scope of the claimed subject matter. The claimed subject matter is not limited to implementations that solve any or all disadvantages noted in the Back-ground.

An open roof construction comprises at least one guide rail on a side of a roof opening, a front closure panel and an adjacent rear closure panel. The front closure panel is supported by an operating mechanism and is adjustable between a closed position, in which it closes the roof opening, and an open position in which it is slid rearwardly above the rear closure panel. The operating mechanism comprises rear support members which are connected to the front closure panel and two parallel guide tracks on the stationary part. A rear guide track portion thereof extends rearwardly beyond a rear edge of the roof opening. The support member is in engagement with said rear guide track. The rear closure panel and the sidewardly adjacent fixed roof include a passage opening to allow the support member to support the front closure panel when the support member is positioned in the rear guide track portion. The rear closure panel and the adjacent fixed roof are each provided with a deformable seal to close the passage opening and to allow the support member to move between the seals.

The seals, when viewed from above, extend in a non-parallel fashion with respect to each other and to the guide track at least along a part of the rear guide track portion.

By placing the seal on the fixed roof non-parallel with respect to the guide track it may extend parallel to the cantrail providing a better visual appearance and avoiding the use of a cover between the cantrail and the fixed roof seal. Of course, the support member for the panel will then move in a non-parallel fashion with respect to the fixed roof seal so that the seal must be able to compensate for the lateral movement between the support member and the seal by means of changes in the lateral compression of the seal. By positioning the panel seal also non parallel to the fixed roof seal it is possible to customize the compression of the seals by the support member during its travel through the guide track portion behind the rear edge of the roof opening, while hardly disturbing the visual appearance.

Preferably, the non-parallelism of the panel seal to the guide track is smaller than the non-parallelism of the fixed roof seal to the guide track such that the seal pressure decreases in a direction towards the position so that the relative seal compression decreases in a direction towards a position where the fixed roof seal is moved away from the longitudinal center of the open roof construction, when seen from above. In case of a rearwardly converging cantrail this is in forward direction, i.e. toward the rear edge of the roof opening. In this manner more relative lateral movement between support member and seals is possible. Preferably, the seal pressure decreases to zero, so that along the whole seal length there is some pressure, but a minimal one.

BRIEF DESCRIPTION OF THE DRAWINGS

Aspects of the invention will be elucidated hereafter with reference to the drawings showing embodiments of the open roof construction.

FIGS. 4 and 5 are cross sectional views along the lines IV-IV and V-V, respectively, in FIG. 3.

FIGS. 7 and 8 are cross sectional views along the lines VII-VII and VIII-VIII, respectively, in FIG. 6.

DETAILED DESCRIPTION

Figure 1:
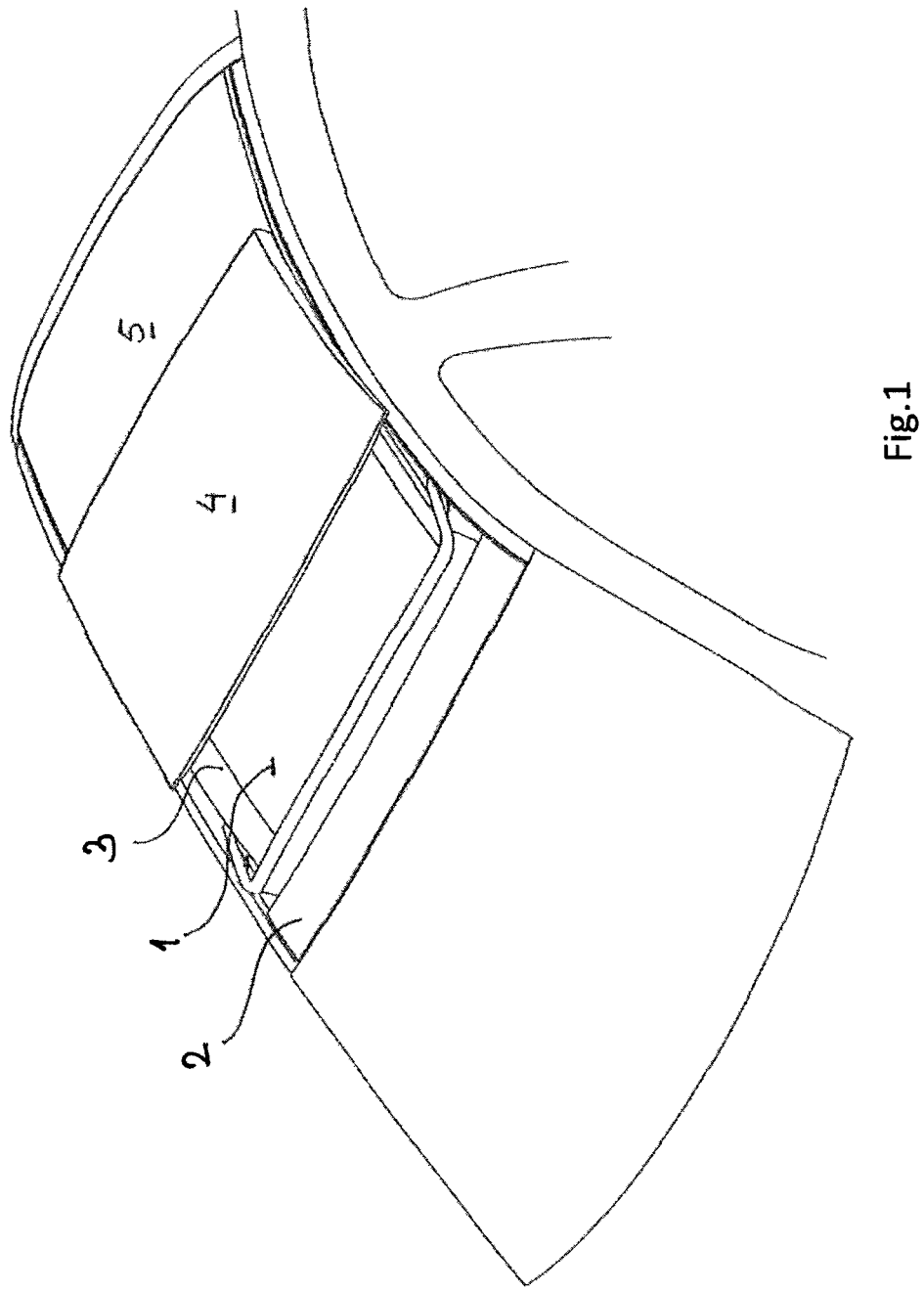
FIG. 1 is a perspective view of a vehicle roof comprising an open roof construction.

The drawings, in particular FIGS. 1-8, show an embodiment of an open roof construction for a vehicle, in particular a motor vehicle such as a passenger car. As is shown in FIG. 1, this vehicle is provided with an opening 1 in its fixed roof 2, whereby it is noted that said fixed roof 2 may either form part of the vehicle or of the open roof construction itself, which in that case makes up the entire roof of the vehicle. The fixed roof 2 may consist of an integral part of the vehicle or of one or more (transparent) panels, which may be removable or form a separate adjustable roof element.

The open roof construction comprises a stationary part, such as a frame 3, and a closure element, in this case in the form of a rigid and preferably transparent front panel 4, for example made of glass or of plastic material, which is movably supported by frame 3. In this embodiment, panel 4 is movable between a closed position, in which roof opening 1 is closed and panel 4 is at least substantially coplanar with fixed roof 2, and an open position, in which panel 4 occupies a rearward position, at least partially above a rear panel 5, in which a very large part of opening 1 is cleared. In the embodiment shown, panel 4 is first tilted to a venting position in which the rear edge of panel 4 is moved upwardly, and then moved rearwardly to positions above the rear panel 5. The rear panel 5 may be transparent and fixed (or made from metal), but a movable rear panel 5 is conceivable as well.

An operating mechanism is provided on each longitudinal side of front panel 4 for effecting the movements of front panel 4. This operating mechanism does not form part of the invention, but is shown and described in co-pending EP application 15196556.3, the contents of which are incorporated herein by reference thereto in its entirety.

The drawings show only parts on one side of the roof, but it should be kept in mind that similar parts are arranged in mirror image on the other side as well. The mechanism is driven by a drive unit including a drive element, such as a drive cable and a manual actuator, such as a crank, or a motor such as an electric motor, for driving the cable. The operating mechanism supports panel 4 and is at least partially guided in a guide rail 6 (FIG. 2) which forms part of or is mounted on frame 3. The guide rail 6 extends along the side edge of roof opening 1, at a lower level than fixed roof 2. Each guide rail 5 for the operating mechanism for panel 4 may be arranged outwardly (i.e. away from the center of the vehicle) of a seal on frame 3 cooperating with the lower side of panel 4 to prevent the ingress of water into the interior of the vehicle. The guide rails 6 may therefore be positioned in the so-called wet portion of open roof construction, outside said seal. Guide rails inside said seal are intended to guide other parts such as a sunshade.

As is furthermore shown in FIGS. 2a-2e, a rear guide track 7 on a curve part is provided, also in the wet portion, extending from a position forwardly of the rear edge of roof opening 1 to a position rearwardly of roof opening 1, i.e. just below fixed roof 2 and rear roof panel 5, and on both lateral sides of rear roof panel 5. A rear portion of guide track 7 extends rearwardly beyond the rear edge of roof opening 1. An elongated open slit or passage opening 8 between rear panel 5 and adjacent fixed roof 2 should connect guide track 7 below the fixed roof 2 with the space above fixed roof 2, which is well known in the art. Guide track 7 may extend at different levels to determine the vertical movements of the rear side of panel 4.

Figure 2A:
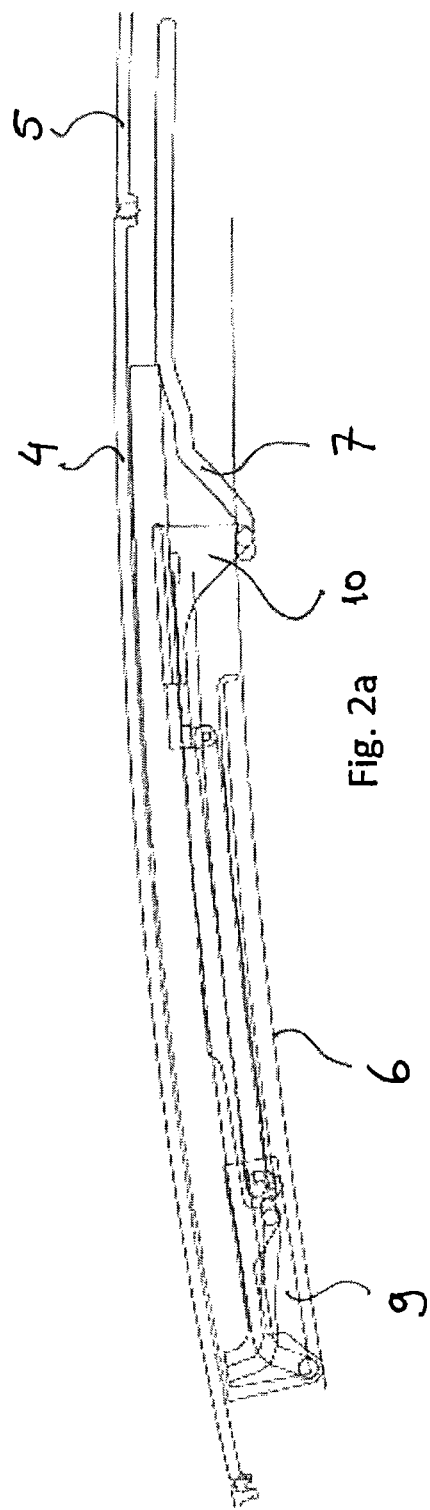
FIGS. 2A-2E are longitudinal sectional views of the closure element and its operating mechanism in 5 different positions.
Figure 2B:
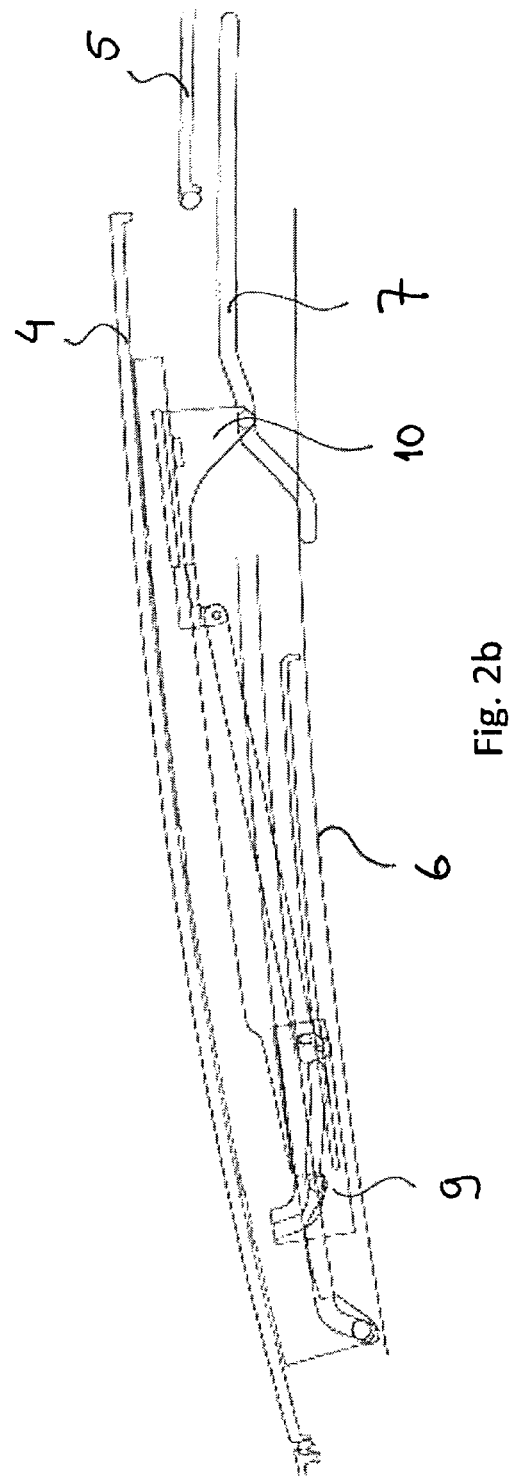
Figure 2C:
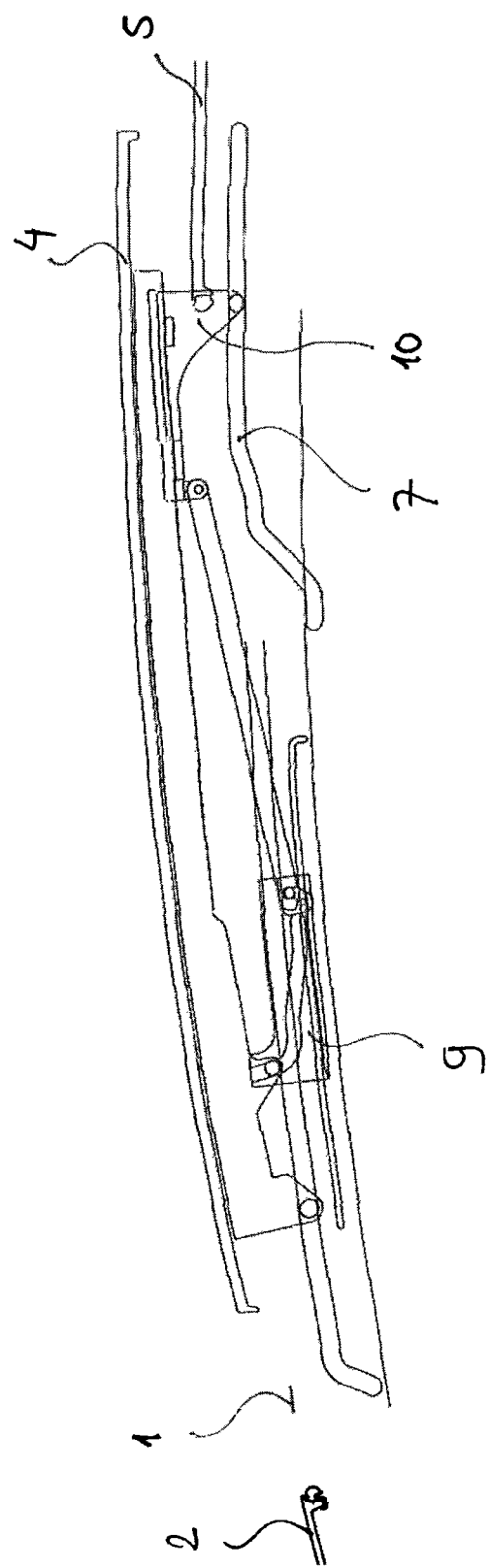
Figure 2D:
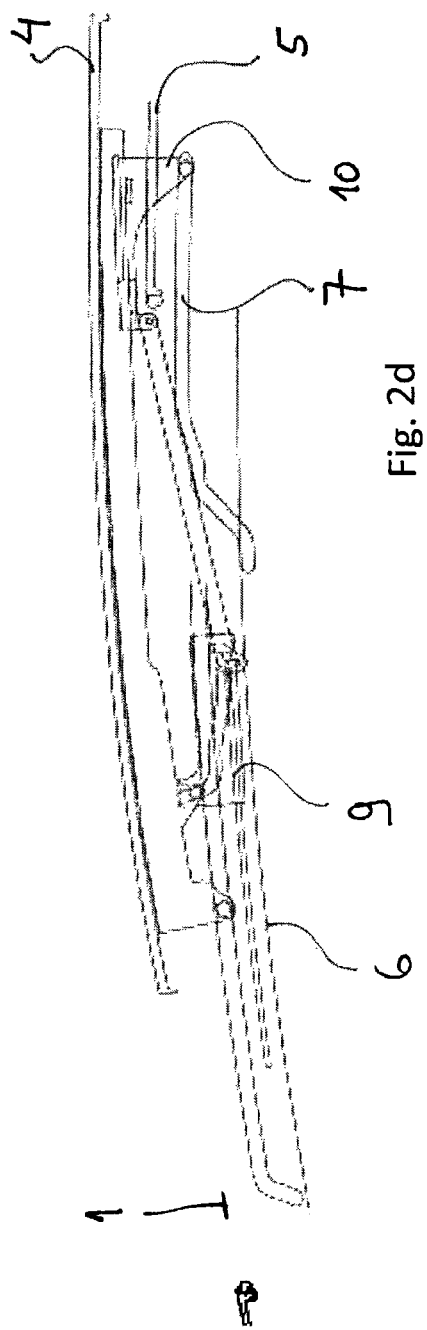

The guide rail 6 slidably receives a driving slide 9 which is engaged by the drive cable so as to adjust panel 4. For this purpose driving slide 9 is connected, at least during a part of the movements of panel 4, to a support member 10 which supports panel 4 and which is slidably guided in guide track 8. The driving slide 9 does not drive support member 10 during all movements of panel 4. In this embodiment, driving slide 9 drives support member 10 during movements of panel 4 from the closed position (FIG. 2a) to the venting position (FIG. 2b) and a first part of a rearward sliding movement of panel 4 (FIGS. 2c and 2d). As support member 10 has reached its rearmost position in guide track 7 (FIG. 2d), driving slide 9 will be decoupled from support member 10 and will be coupled to a front support of panel 4.

Figure 2E:
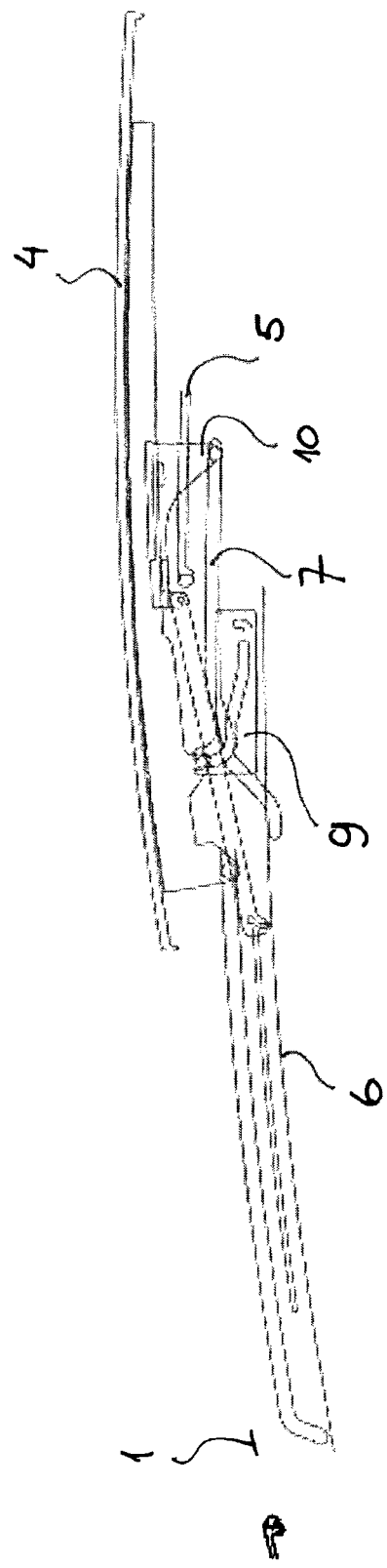

The support member 10 is slidably connected to panel 4 allowing support member 10 to slide with respect to panel 4, when support member 10 is driven by driving slide 9 to move panel 4 to the venting position. It also allows panel 4 to slide with respect to support member 10 when support member 10 is locked to guide rail 6 and panel 4 is driven by driving slide 10 through the front support (FIG. 2e).

Due to the fact that a part of the rearward movement of panel 4 is effected while support member 10 is stationary, guide track and therefore passage opening 8 will not be very long, i.e. between 100 and 200 mm, but lengths may exceed even 800 mm.

The passage opening 11 is positioned between rear panel 5 and laterally adjacent fixed roof 2 and is closed by the use of a panel seal 12 and a fixed roof seal 13 which are in contact with each other to close the passage opening, and are deformable so as to allow passage of support member when it moves back and forth through guide track 7.

Figure 3:
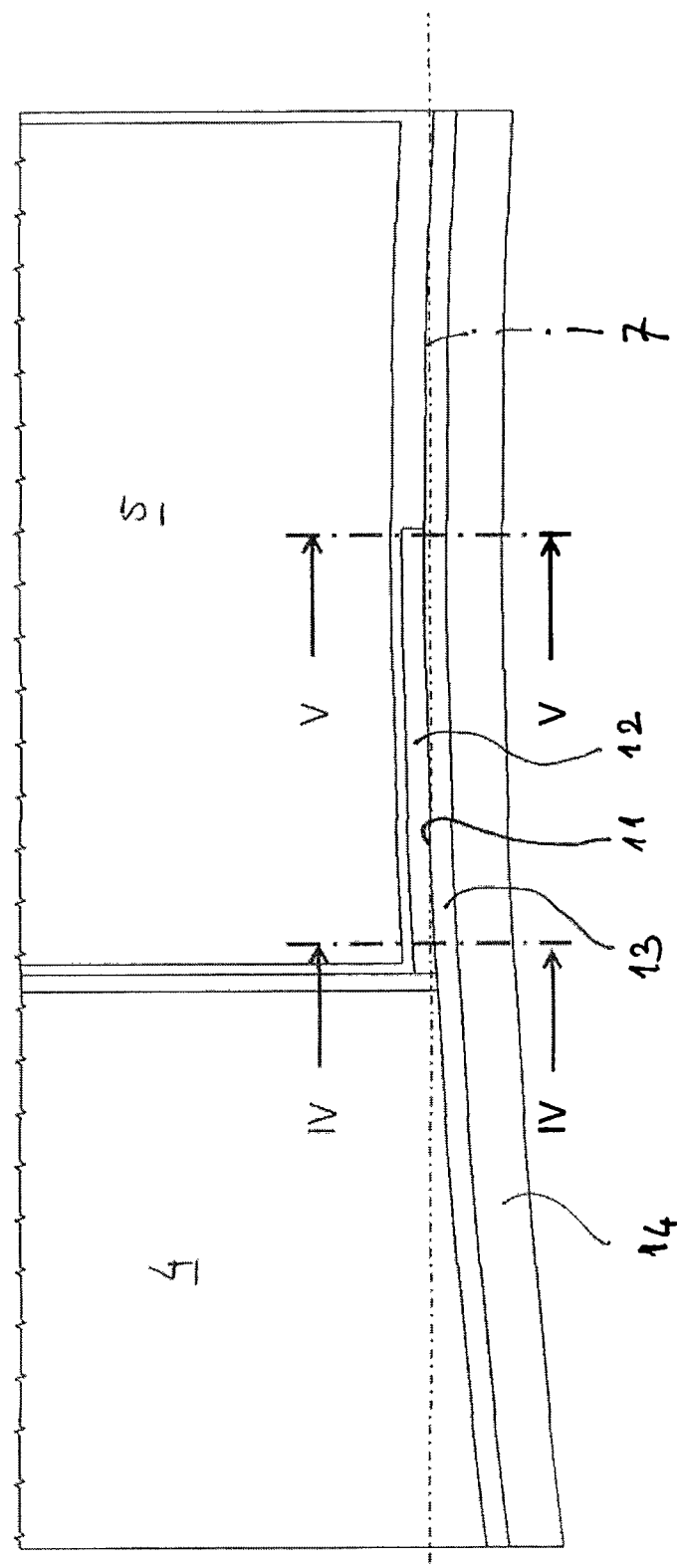
FIG. 3 is a plan view of a passage opening above the guide track
Figure 6:
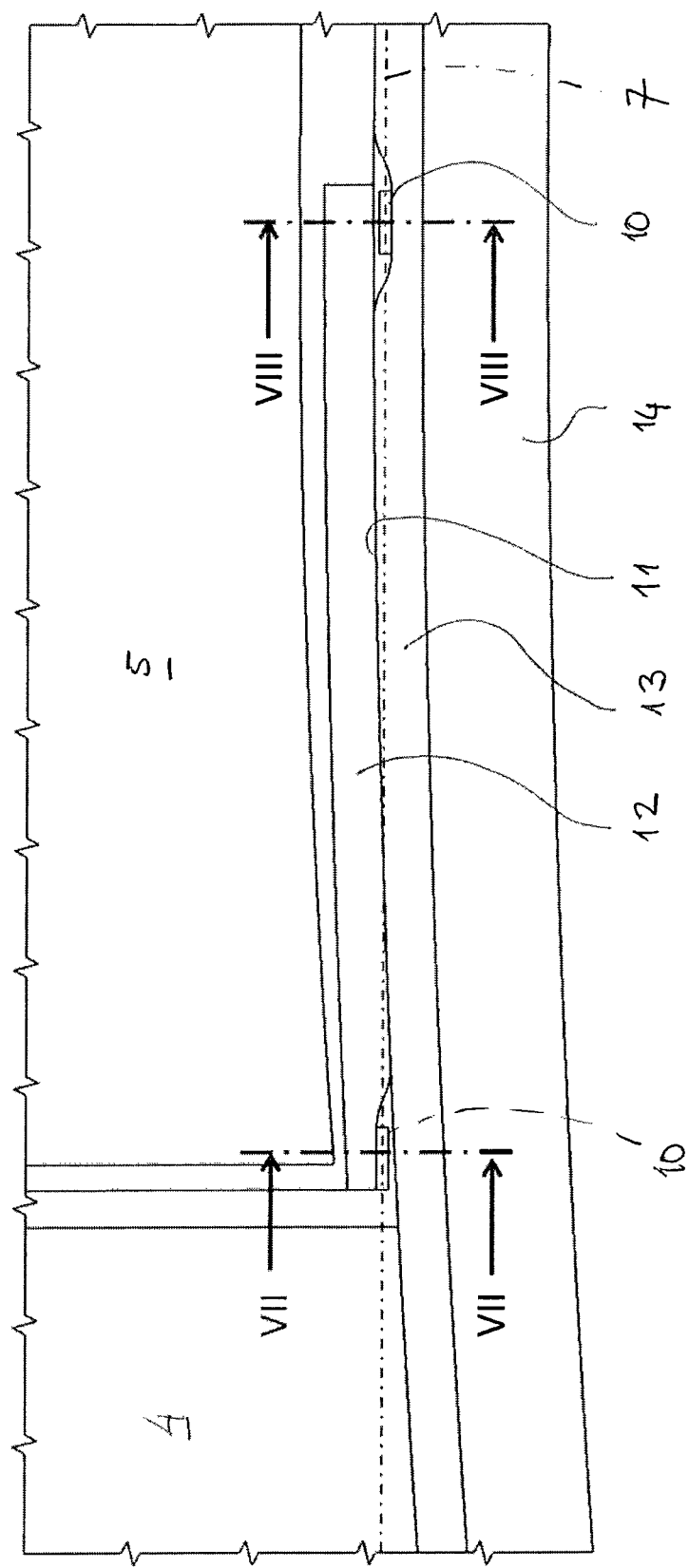
FIG. 6 is a plan view corresponding to that of FIG. 3, but showing a support member in a front and rear position in the passage opening.

In the embodiment shown in FIG. 3, guide tracks 7 (in fact 7 denotes the centerline of the guide track) on either side of roof opening 2, when viewed from above, extend parallel and therefore exactly in Y-direction of the vehicle. A cantrail 14 of the vehicle often does not extend parallel to the Y-direction, sometimes under an angle, other times with a slight curve. For visual reasons, it is advantageous to have the seals 12, 13 extend parallel thereto. This however means that, because the seals 12, 13, bulb seals or other seals, are often extruded and thus have a constant cross-section, the surfaces to which the seals are attached extend non-parallel to the Y-direction as well, and therefore non-parallel to the direction of movement of support member 10. Slight deviations from parallelism can be compensated by having the seals 12, 13 compressed to a bigger or lesser extent depending on the longitudinal position of support member with respect to seals 12, 13. With slightly converging cantrails 14, at the beginning of seals 12, 13, i.e. near the rear side of roof opening 1, panel seal 12 will be compressed by support member 10 (to the left in FIG. 6, and in FIG. 7), while at the rear end of seals 12, 13 it is fixed roof seal 13 that is compressed (to the right in FIG. 6, and in FIG. 8).

This compensation can be increased by having the seals 12, 13 extending non-parallel with respect to each other as well. In FIGS. 4 and 5 it is shown that at the beginning of the seals (FIG. 4), the seals 12, 13 hardly touch each other, and therefore the compression c of the seals 12, 13 is zero or almost zero, while at the opposite end of the seals 12, 13 (FIG. 5) the compression c of the seals 12, 13 is larger, e.g. having its normal value. Due to this measure, the lateral deviation a (compare FIGS. 7, 8) of the fixed roof seal 13 can be larger and especially with a short rear guide track 7 and thus a short passage opening 11 this can be sufficient to allow the fixed roof seal 13 to extend parallel to the cantrail 14.

The position and curve of panel seal 12 can be determined by the means of attachment such as a plastic part, e.g. encapsulation 15, with which seal 12 is fixed to rear panel 5. If the edge of rear panel 5 extends parallel to cantrail 14 (so both have a deviation a in FIGS. 7, 8), the encapsulation 15 will be narrower at the forward end of seal 12, see comparison of FIGS. 4, 5. Due to this, the lateral deviation b of panel seal 12 is smaller than deviation a of fixed roof seal 13 (see also FIGS. 7, 8). It is however also possible to adapt the shape of the edge of rear panel 5 to the required curve of panel seal 12, such that encapsulation 15 will have the same width along the length of panel seal 12.

With a bulb seal having a bulb size (e in FIG. 5) of 8 mm, the lateral deviation a of the fixed roof seal 13 with respect to the Y-direction is maximally 2 mm if the lateral deviation b of the panel seal is also 2 mm, that is if the seals 12, 13 extend parallel. For each mm of relative deviation a-b between both seals 12, 13 the maximum deviation of the fixed roof seal increases with 1 mm as well. The maximum relative deviation between seals 12, 13 is ca. 5 mm. This means that if the compression c of seals 12, 13 at the front end of the seals (FIG. 4) is 0 mm, the compression c at the rear end of the seals (FIG. 5) is 5 mm, but 1-2.5 mm is now preferred. Bulb seals may have a size of 6-15 mm, but 8 mm is presently most common. The lateral deviation of fixed roof seal 13 may vary between 0 and 5 mm, the shape of the cantrail and the length of seal 12, 13 will determine this.

The invention is not limited to the embodiment shown in the drawing and described above which may be varied in different manners within the scope of the appended claims.

What is claimed is:

1. An open roof construction for a vehicle having a roof opening in a fixed roof, comprising:
   a stationary part for attachment to the fixed roof, having at least one guide rail on a side of the fixed roof opening;
   a front closure panel and an adjacent rear closure panel
   an operating mechanism supporting the front closure panel and being adjustable between a closed position, in which the front closure panel closes the roof opening, and an open position in which the front closure panel is slid rearwardly above the rear closure panel, wherein the operating mechanism comprises:
   rear support members which are connected to the front closure panel and two parallel guide tracks on the stationary part, a rear guide track portion of each guide track extending rearwardly beyond a rear edge of the roof opening, the rear support members being in engagement with said rear guide track portions, the rear closure panel and a laterally adjacent portion of the fixed roof including a passage opening between them to allow each rear support member to support the front closure panel when the rear support member is positioned in the rear guide track portion, the rear closure panel having a deformable panel seal and the laterally adjacent portion of the fixed roof having a deformable fixed roof seal, the seals being configured to close the passage opening and to allow the rear support member to move between the seals, wherein the seals, when viewed from above, extend in a non-parallel fashion with respect to each other and to the guide track at least along a part of the rear guide track portion.

2. The open roof construction according to claim 1, wherein a non-parallelism of the panel seal to the guide track is smaller than a non-parallelism of the fixed roof seal to the guide track so that a relative seal compression decreases in a direction towards a position where the fixed roof seal is moved away from a longitudinal center of the open roof construction, when seen from above.

3. The open roof construction according to claim 2, wherein a relative seal compression is substantially zero at a position where fixed roof seal is moved away from the longitudinal center of the open roof construction, when seen from above.

4. The open roof construction according to claim 1, wherein a lateral deviation of the panel seal with respect to the guide track is at least 0.5 mm smaller than that of the fixed roof seal.

5. The open roof construction according to claim 1, wherein a lateral deviation of the panel seal with respect to the guide track is at least 1 mm and maximally 5 mm smaller than that of the fixed roof seal.

6. The open roof construction according to claim 1 wherein the seals are bulb seals having a constant cross-section.

7. The open roof construction according to claim 1, wherein each of the seals have a width of 6-15 mm.

8. The open roof construction according to claim 1, wherein each of the seals have a width of approximately 8 mm.

9. The open roof construction according to claim 1, wherein the rear support members are slidably connected to the front closure panel, such that the front closure panel is configured to move rearwardly with respect to the rear support members when the rear support members have reached their rearmost position.

10. The open roof construction according to claim 6, wherein each of the seals have a width of around 8 mm.

11. A vehicle having a roof opening in a fixed roof and an open roof construction for the roof opening, the open roof construction comprising:
   a stationary part attached to the fixed roof, having a pair of guide rails, the guide rails being disposed on opposite sides of the roof opening;
   a front closure panel and an adjacent rear closure panel
   an operating mechanism for each guide rail, each operating mechanism supporting the front closure panel and being adjustable between a closed position, in which the front closure panel closes the roof opening, and an open position in which the front closure panel is slid rearwardly above the rear closure panel, wherein each operating mechanism comprises:
   rear support members which are connected to the front closure panel and two parallel guide tracks on the stationary part, each guide track having a rear guide track portion thereof extending rearwardly beyond a rear edge of the roof opening, each rear support member being in engagement with one of said rear guide track portions, the rear closure panel and a laterally adjacent portion of the fixed roof on opposed sides of the rear closure panel each including a passage opening between them to allow the rear support members to support the front closure panel when each rear support member is positioned in each respective rear guide track portion, the rear closure panel having a panel seal and the laterally adjacent portion of the fixed roof having a fixed roof seal for each passage, the seals on each side configured to provide a seal that closes the corresponding passage opening and also separates to allow the corresponding rear support member to move between the seals, wherein the seals, when viewed from above, extend in a non-parallel fashion with respect to each other and to the corresponding guide track at least along a part of each rear guide track portion.

12. The vehicle according to claim 11, wherein for each guide track, a non-parallelism of the panel seal to each guide track is smaller than a non-parallelism of the fixed roof seal to the guide track so that a relative seal compression decreases in a direction towards a position where the fixed roof seal is moved away from a longitudinal center of the open roof construction, when seen from above.

13. The vehicle according to claim 12, wherein for each guide track, a relative seal compression is substantially zero at a position where the fixed roof seal is moved away from the longitudinal center of the open roof construction, when seen from above.

14. The vehicle according to claim 12, wherein wherein for each guide track, a lateral deviation of the panel seal with respect to the guide track is at least 0.5 mm smaller than that of the fixed roof seal.

15. The vehicle according to claim 11, wherein wherein for each guide track, a lateral deviation of the panel seal with respect to the guide track is at least 1 mm and maximally 5 mm smaller than that of the fixed roof seal.

16. The vehicle according to claim 11 wherein the seals are bulb seals having a constant cross-section.

17. The vehicle according to claim 11, wherein each of the seals have a width of 6-15 mm.

18. The vehicle according to claim 11, wherein each of the seals have a width of approximately 8 mm.

19. The vehicle according to claim 11, wherein the rear support members are slidably connected to the front closure panel, such that the front closure panel is configured to move rearwardly with respect to the rear support members when the rear support members have reached their rearmost position.

20. The vehicle according to claim 6, wherein each the seals have a width of around 8 mm.

* * * * *